(12) United States Patent
Li et al.

(10) Patent No.: US 9,749,310 B2
(45) Date of Patent: Aug. 29, 2017

(54) TECHNOLOGIES FOR AUTHENTICATION AND SINGLE-SIGN-ON USING DEVICE SECURITY ASSERTIONS

(71) Applicant: Intel Corporation, Santa Clara, CA (US)

(72) Inventors: Hong Li, El Dorado Hills, CA (US); Suman Sharma, San Jose, CA (US); John B. Vicente, Roseville, CA (US); Luis A. Gimenez, Granite Bay, CA (US); Carlton D. Ashley, Folsom, CA (US); Navneet Malpani, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 52 days.

(21) Appl. No.: 14/670,955

(22) Filed: Mar. 27, 2015

(65) Prior Publication Data
US 2016/0285858 A1    Sep. 29, 2016

(51) Int. Cl.
  *G06F 21/44* (2013.01)
  *G06F 21/41* (2013.01)
  *H04L 29/06* (2006.01)
  *H04L 29/08* (2006.01)

(52) U.S. Cl.
  CPC .......... *H04L 63/0815* (2013.01); *G06F 21/41* (2013.01); *G06F 21/44* (2013.01); *H04L 63/10* (2013.01); *H04L 67/02* (2013.01)

(58) Field of Classification Search
  None
  See application file for complete search history.

(56) References Cited

U.S. PATENT DOCUMENTS

| | | | |
|---|---|---|---|
| 9,081,951 B2* | 7/2015 | Sondhi | |
| 2011/0131416 A1* | 6/2011 | Schneider | H04L 9/002 713/172 |
| 2012/0047578 A1* | 2/2012 | Lee | G06F 21/57 726/22 |
| 2012/0151568 A1* | 6/2012 | Pieczul | H04L 63/0815 726/8 |

(Continued)

*Primary Examiner* — Saleh Najjar
*Assistant Examiner* — Louis Teng
(74) *Attorney, Agent, or Firm* — Barnes & Thornburg LLP

(57) ABSTRACT

Technologies for remote device authentication include a client computing device, an identity provider, and an application server in communication over a network. The identity provider sends an authentication challenge to the client. A capability proxy of the client intercepts an authentication challenge response and retrieves one or more security assertions from a secure environment of the client computing device. The capability proxy may be an embedded web server providing an HTTP interface to platform features of the client. The client sends a resource access token based on the security assertions to the identity provider. The identity provider verifies the resource access token and authenticates the client computing device based on the resource access token in addition to user authentication factors such as username and password. The identity provider sends an authentication response to the client, which forwards the authentication response to the application server. Other embodiments are described and claimed.

16 Claims, 6 Drawing Sheets

(56) References Cited

U.S. PATENT DOCUMENTS

| | | | | |
|---|---|---|---|---|
| 2014/0181925 A1* | 6/2014 | Smith | ............... | G06F 21/45 726/6 |
| 2014/0344446 A1* | 11/2014 | Rjeili | ............... | H04L 43/04 709/224 |
| 2016/0094531 A1* | 3/2016 | Unnikrishnan | ......... | G06F 21/30 726/7 |
| 2016/0094664 A1* | 3/2016 | Olcese | ............ | H04L 67/142 709/225 |

* cited by examiner

TECHNOLOGIES FOR AUTHENTICATION AND SINGLE-SIGN-ON USING DEVICE SECURITY ASSERTIONS

BACKGROUND

Many modern computing applications are provided as cloud computing applications or software-as-a-service (SaaS) applications. For example, users associated with an enterprise or other organization may access applications, services, and data provided by third-party cloud service providers. Typical enterprise systems rely on network infrastructure to authenticate devices that access remote cloud applications. For example, enterprise systems may allow access to cloud applications for devices that are physically connected to a corporate intranet. As another example, enterprise systems may require mobile clients outside of the corporate intranet to connect to a virtual private network (VPN) prior to accessing the cloud application. In such systems, the VPN, firewall, and/or other enterprise network edge infrastructure is used to provide device authentication.

The security assertion markup language (SAML) version 2.0 standard, approved by OASIS®, defines a web browser single-sign-on (SSO) profile. In a typical implementation of the SAML web browser SSO profile, a cloud server may redirect a user agent to an identity provider located behind an enterprise firewall. In those implementations, the user agent may only access the identity provider after joining the enterprise VPN. Thus, in those implementations of the SAML web browser SSO profile, the enterprise network edge infrastructure is also used for device authentication.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
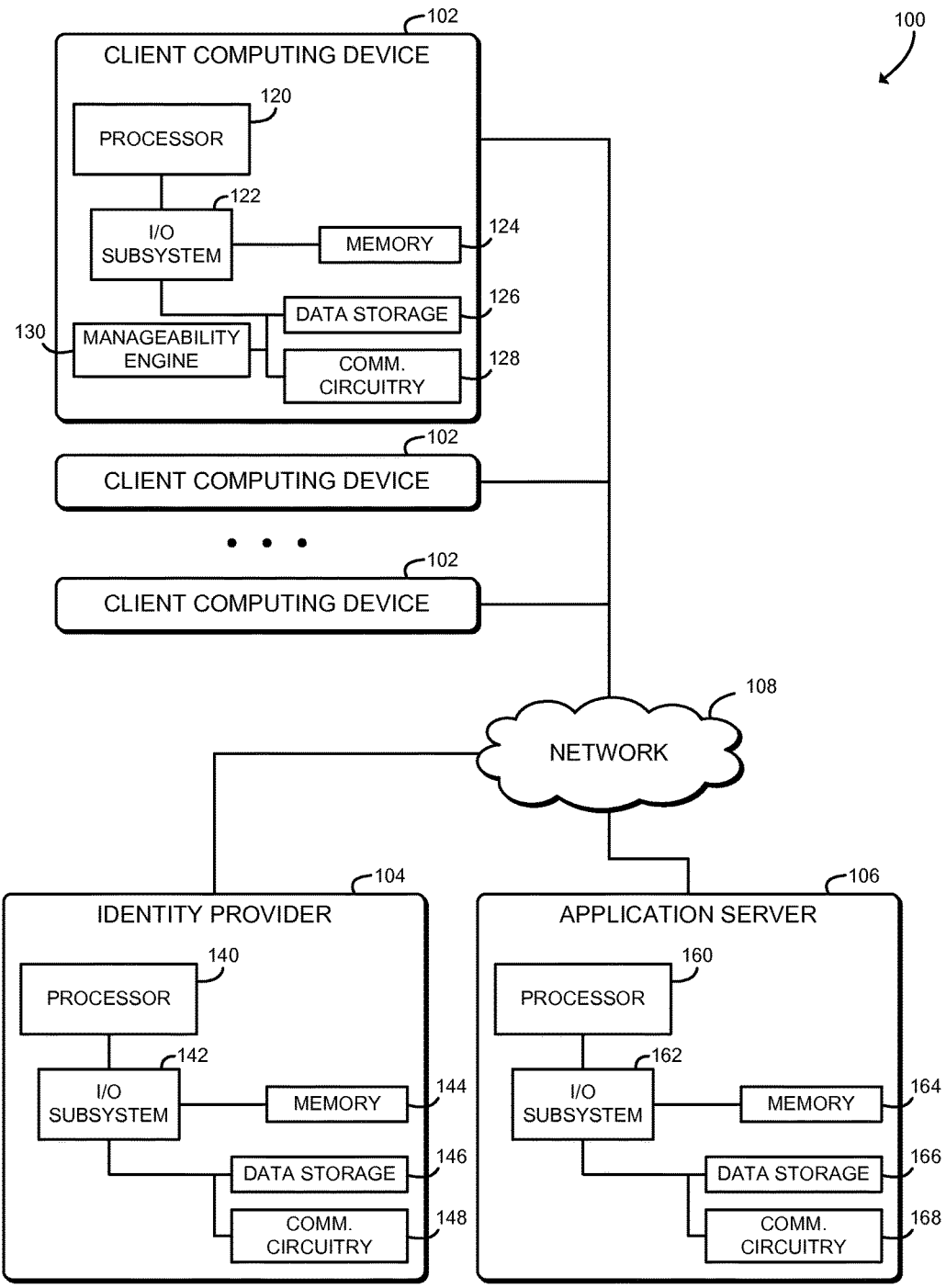
FIG. 1 is a simplified block diagram of at least one embodiment of a system for secure device authentication.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for secure device authentication includes several client computing devices 102, an identity provider 104, and an application server 106 in communication over a network 108. In use, as described in more detail below, each client computing device 102 may perform a single-sign-on process with the application server 106 and the identity provider 104 in order to access an application provided by the application server 106. In particular, a client computing device 102 requests access to the application and is redirected by the application server 106 to the identity provider 104. The identity provider 104 provides an authentication challenge to the client computing device 102. The client computing device 102 generates an authentication challenge response (e.g., a username and password) that is intercepted by a capability proxy executed by the client computing device 102. The capability proxy provides an HTTP-based interface (e.g., a RESTful API) to platform features of the client computing device 102. The capability proxy retrieves one or more security assertions from a secure environment of the client computing device 102, and the security assertions are transmitted to the identity provider 104 with the authentication challenge response. The security assertions may include, for example, assertions relating to a provisioned device management policy or device trust level assertions. The identity provider 104 then authenticates the client computing device 102 based on the client's response to authentication challenge (e.g., username and password) in combination with the security assertions and provides the client computing device 102 with an authentication response that may be provided to the application server 106. Therefore, the system 100 allows the identity provider 104 to securely verify one or more security assertions associated with the client computing device 102 without requiring the client computing device 102 to connect to an enterprise network or virtual private network. Accordingly, the system 100 may authenticate devices and users without requiring the use of a network edge infrastructure (e.g., without using a firewall and/or VPN). Because the capability proxy provides an HTTP-based interface, the system 100 may provide operating-system independent device authentication and thus may not require specialized plugins or other native code. Additionally, although the system 100 is disclosed herein with regard to web browser single-sign-on, it should be understood that the technologies disclosed herein may be used with any other remote device authentication protocol or profile.

Each client computing device 102 may be embodied as any type of computation or computer device capable of performing the functions described herein, including, without limitation, a computer, a desktop computer, a workstation, a laptop computer, a notebook computer, a tablet computer, a mobile computing device, a wearable computing device, a network appliance, a web appliance, a distributed computing system, a processor-based system, and/or a consumer electronic device. As shown in FIG. 1, the client computing device 102 illustratively includes a processor 120, an input/output subsystem 122, a memory 124, a data storage device 126, and communication circuitry 128. Of course, the client computing device 102 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the client computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the client computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processors 120, the memory 124, and other components of the client computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication circuitry 128 of the client computing device 102 may be embodied as any communication circuit, device, or collection thereof, capable of enabling communications between the client computing device 102, the identity provider 104, the application server 106, and/or other remote devices over the network 108. The communication circuitry 128 may be configured to use any one or more communication technology (e.g., wired or wireless communications) and associated protocols (e.g., Ethernet, Bluetooth®, Wi-Fi®, WiMAX, etc.) to effect such communication.

In some embodiments, each client computing device 102 may further include a manageability engine 130. The manageability engine 130 is embodied as a device that provides remote configuration, control, and/or management of the client computing device 102. The manageability engine 130 may include an out-of-band processor, which may be embodied as a processor, microcontroller, or other control circuit separate and distinct from the main processor 120 of the client computing device 102. As such, the manageability engine 130 is capable of operating independently of the state of the rest of the client computing device 102. That is, the manageability engine 130 is capable of operating regardless of the operating state of the processor 120, including when the client computing device 102 is powered off, when the client computing device 102 is executing a pre-boot firmware environment, when an operating system of the client computing device 102 is active, and when the operating system is crashed or otherwise inactive. The manageability engine 130 may establish a firmware environment that is separate and distinct from the software environment established by the processor 120. The manageability engine 130 is also capable of communicating using the communication circuitry 128 independently of the state of the client computing device 102, also known as "out-of-band" communication. In some embodiments, the manageability engine 130 may include a dedicated network adaptor for such out-of-band communication, in addition to, or instead of, connecting via the communication circuitry 128. In some embodiments, the manageability engine 130 may be incorporated into or otherwise form a part of the I/O subsystem 122.

The identity provider 104 is configured to authenticate the user of each client computing device 102 and verify that each client computing device 102 is trusted. The identity provider 104 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. Illustratively, the identity provider 104 includes a processor 140, an I/O subsystem 142, a memory 144, a data storage device 146, communication circuitry 148, and/or other components and devices commonly found in a server or similar computing device. Those individual components of the identity provider 104 may be similar to the corresponding components of the client computing device 102, the description of which is applicable to the corresponding components of the identity provider 104 and is not repeated herein so as not to obscure the present disclosure. Additionally, in some embodiments, the identity provider 104 may be embodied as a "virtual server" formed from multiple computing devices distributed across the network 108 and operating in a public or private cloud. Accordingly, although the identity provider 104 is illustrated in FIG. 1 as embodied as a single server computing device, it should be appreciated that the identity provider 104 may be embodied as multiple devices cooperating together to facilitate the functionality described below.

The application server 106 is configured to provide an application, service, and/or other data to authenticated client computing devices 102. The application server 106 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. Illustratively, the application server 106 includes a processor 160, an I/O subsystem 162, a memory 164, a data storage device 166, communication circuitry 168, and/or other components and devices commonly found in a server or similar computing device. Those individual components of the application server 106 may be similar to the corresponding components of the client computing device 102 and/or the identity provider 104, the description of which is applicable to the corresponding components of the application server 106 and is not repeated herein so as not to obscure the present disclosure. Additionally, in some embodiments, the application server 106 may be embodied as a "virtual server" formed from multiple computing devices distributed across the network 108 and operating in a public or private cloud. Accordingly, although the application server 106 is illustrated in FIG. 1 as embodied as a single server computing device, it should be appreciated that the application server 106 may be embodied as multiple devices cooperating together to facilitate the functionality described below.

As discussed in more detail below, the client computing devices 102, the identity provider 104, and the application server 106 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet. As such, the network 108 may include any number of additional devices, such as additional computers, routers, and switches, to facilitate communications among the devices of the system 100.

Figure 2:
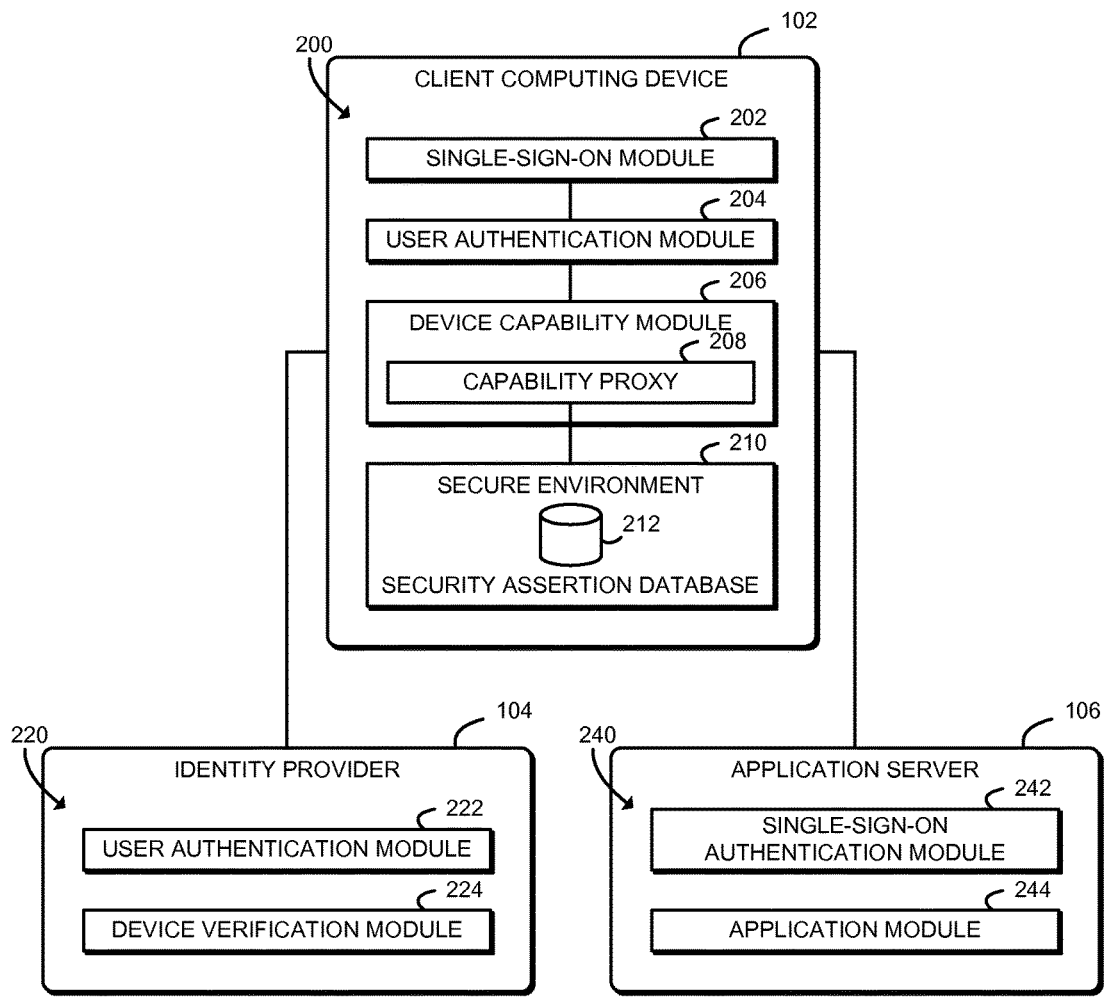
FIG. 2 is a simplified block diagram of at least one embodiment of various environments that may be established by the system of FIG. 1.

Referring now to FIG. 2, in an illustrative embodiment, a client computing device 102 establishes an environment 200 during operation. The illustrative environment 200 includes a single-sign-on module 202, a user authentication module 204, a device capability module 206, and a secure environment 210. The various modules of the environment 200 may be embodied as hardware, firmware, software, or a combination thereof. For example the various modules, logic, and other components of the environment 200 may form a portion of, or otherwise be established by, the processor 120 or other hardware components of the client computing device 102. As such, in some embodiments, any one or more of the modules of the environment 200 may be embodied as a circuit or collection of electrical devices (e.g., a single-sign-on circuit, a user authentication circuit, etc.).

The single-sign-on module 202 is configured to perform a single-sign-on authentication process with the application server 106 and the identity provider 104. In particular, the single-sign-on module 202 is configured to transmit a service request to the application server 106 and in response receive a redirect from the application server 106 that identifies the identity provider 104. The single-sign-on module 202 is further configured to transmit an authentication request to the identity provider 104 in response to the redirect and receive a corresponding authentication response from the identity provider 104 in response to completing an authentication challenge, as described below. The single-sign-on module 202 is further configured to transmit the authentication response to the application server 106 and access an application and/or service provided by the application server 106 if the authentication was successful.

The user authentication module 204 is configured to receive an authentication challenge from the identity provider 104 and generate an authentication challenge response to authenticate a user of the client computing device 102. The authentication challenge response may include, for example, a username and password or other authentication factors provided by the user.

The device capability module 206 is configured to intercept, by a capability proxy 208 of the client computing device 102, the authentication challenge response. The device capability module 206 is further configured to retrieve, by the capability proxy 208, one or more security assertions from the secure environment 210, generate, by the capability proxy 208, a resource access token (RAT) as a function of the security assertions, and transmit, by the capability proxy 208, the authentication challenge response including the RAT to the identity provider 104. The capability proxy 208 is configured to establish an HTTP-based interface to access platform features of the client computing device 102. The platform features may include hardware features, firmware features, or other features that are not exposed or otherwise accessible by an operating system of the client computing device 102. For example, the capability proxy 208 may be embodied as an embedded technology access web server. In some embodiments, the capability proxy 208 may be executed by the manageability engine 130 or otherwise provided by hardware of the client computing device 102 (e.g., by the I/O subsystem 122). The capability proxy 208 may be embodied as, for example, Intel® Technology Access (TA), which is included in certain processors 120 and/or I/O subsystems 122 manufactured by Intel® Corporation.

The secure environment 210 is configured to provide a secure storage area for sensitive data stored by the client computing device 102. In particular, the secure environment 210 may store or otherwise maintain a security assertion database 212. The security assertion database 212 may include security assertions, which may be embodied as data or other information indicative of the trustworthiness of the client computing device 102. For example, the security assertion database 212 may include one or more device management policies or indications that the client computing device 102 is subject to a device management policy (e.g., a management policy certificate). As another example, the security assertion database 212 may include one or more device trust level assertions. Each device trust level assertion may be indicative of a trust level assigned to the client computing device 102 by an enterprise or other owner of the client computing device 102. The contents of the security assertion database 212 may be provisioned, for example, by an enterprise or owner of the client computing device 102. In some embodiments, the secure environment 210 may be established or otherwise protected by the manageability engine 130 of the client computing device 102. Additionally or alternatively, in some embodiments the secure environment 210 may be established by tamper-resistant software of the client computing device 102. Tamper-resistant software may include technological restrictions to protect the security assertion database 212 from unauthorized disclosure (e.g., restricted permissions, encryption, obfuscation, or other hardening techniques).

Still referring to FIG. 2, in the illustrative embodiment, the identity provider 104 establishes an environment 220 during operation. The illustrative environment 220 includes a user authentication module 222 and a device verification module 224. The various modules of the environment 220 may be embodied as hardware, firmware, software, or a combination thereof. For example the various modules, logic, and other components of the environment 220 may form a portion of, or otherwise be established by, the processor 140 or other hardware components of the identity provider 104. As such, in some embodiments, any one or more of the modules of the environment 220 may be embodied as a circuit or collection of electrical devices (e.g., a user authentication circuit and/or a device verification circuit).

The user authentication module 222 is configured to receive an authentication request from a client computing device 102 and transmit an authentication challenge to the client computing device 102 in response. The user authentication module 222 is further configured to receive an authentication challenge response from the client computing device 102. The authentication challenge response includes a resource access token (RAT) indicative of one or more security assertions associated with the client computing device 102. The user authentication module 222 is further configured to transmit a successful authentication response to the client computing device 102 if the client computing device 102 is determined to be trusted, as described below. The user authentication module 222 may also be configured to authenticate a user of the client computing device 102 using the authentication challenge response.

The device verification module 224 is configured to determine whether the client computing device 102 is trusted based on the resource access token (RAT) included in the authentication challenge response. The device verification module 224 may be configured to determine whether the client computing device 102 is subject to a device management policy, or may be configured to determine a device trust level assertion associated with the client computing device 102.

Still referring to FIG. 2, in the illustrative embodiment, the application server 106 establishes an environment 240 during operation. The illustrative environment 240 includes a single-sign-on authentication module 242 and an application module 244. The various modules of the environment 240 may be embodied as hardware, firmware, software, or a combination thereof. For example the various modules, logic, and other components of the environment 240 may form a portion of, or otherwise be established by, the processor 160 or other hardware components of the application server 106. As such, in some embodiments, any one or more of the modules of the environment 240 may be embodied as a circuit or collection of electrical devices (e.g., a single-sign-on authentication circuit or an application circuit).

The single-sign-on authentication module 242 is configured to perform a single-sign-on authentication process with the client computing device 102 and the identity provider 104. In particular, the single-sign-on authentication module 242 is configured to receive a service request from the client computing device 102 and in response transmit a redirect that identifies the identity provider 104 to the client computing device 102. The single-sign-on authentication module 242 is further configured to receive an authentication response from the client computing device 102. The client computing device 102 originally received the authentication response from the identity provider 104 as described above.

The application module 244 is configured to provide access to an application, service, or other data to the client computing device 102 following successful authentication. The application module 244 may provide, for example, one or more cloud-based productivity or collaboration applications. In some embodiments, the application module 244 may provide one or more software-as-a-service (SaaS) applications to the client computing device 102. The application module 244 is further configured to deny access to the application if authentication was not successful.

Figure 3A:
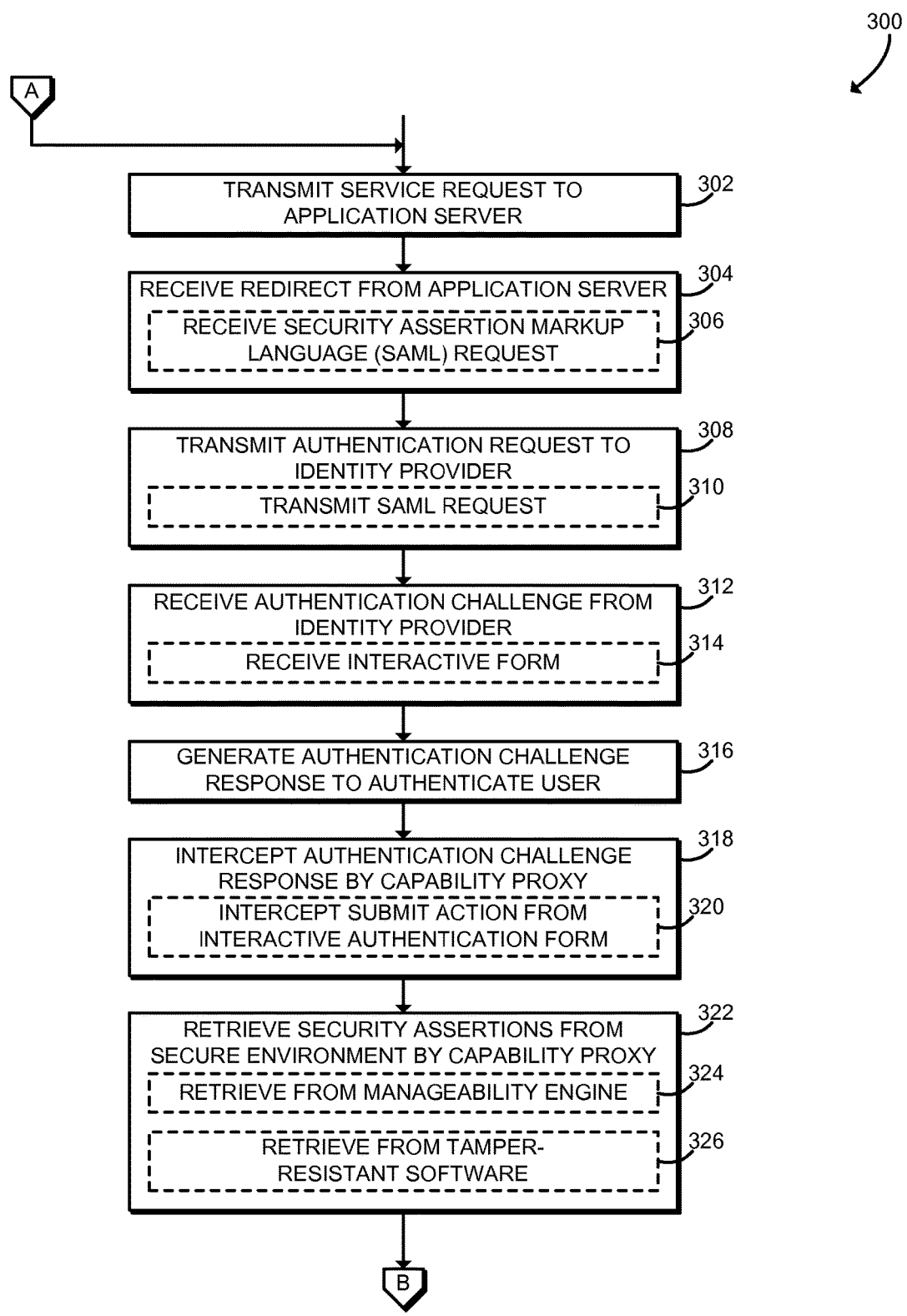
FIGS. 3A and 3B are a simplified flow diagram of at least one embodiment of a method for secure device authentication that may be executed by a client computing device of the system of FIGS. 1 and 2.
Figure 3B:
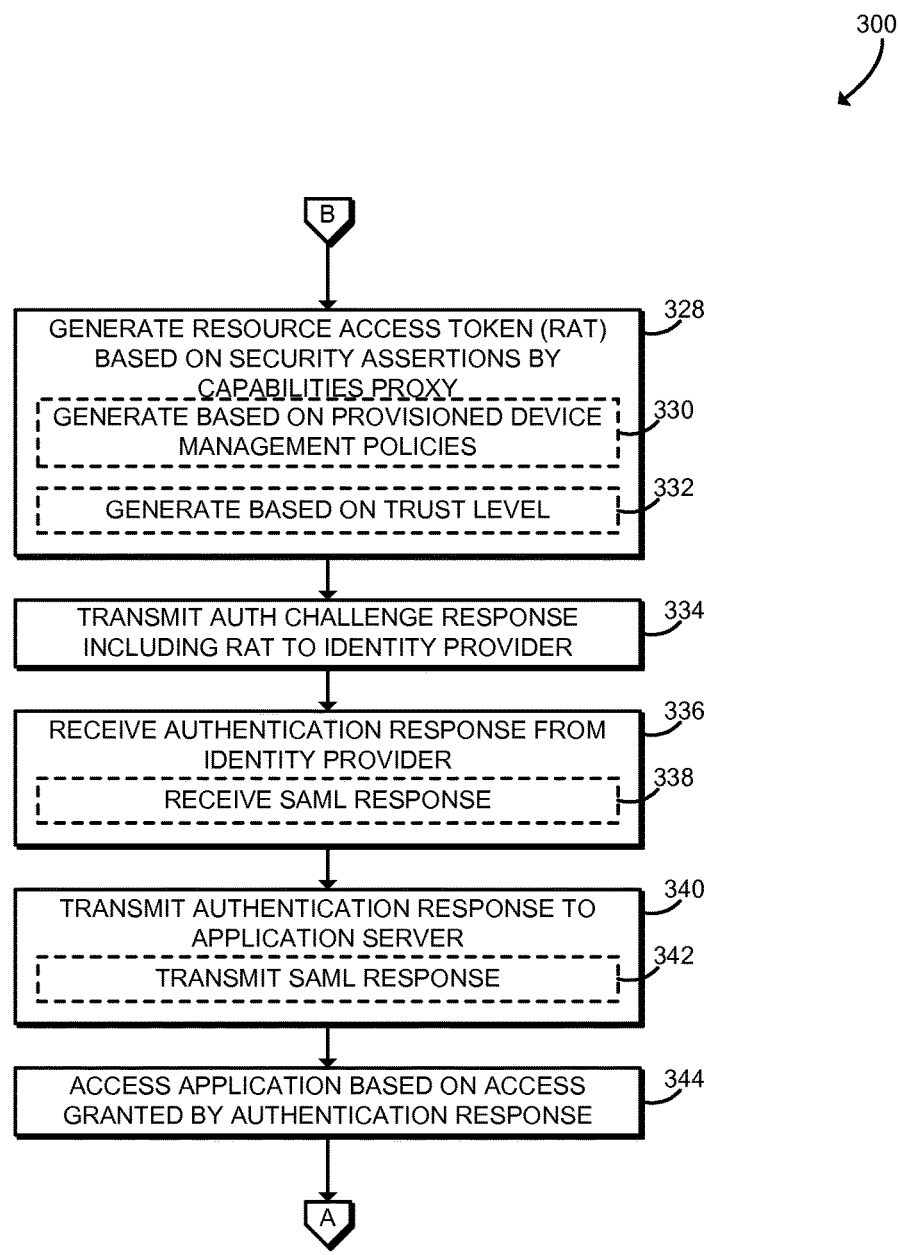

Referring now to FIGS. 3A and 3B, in use, a client computing device 102 may execute a method 300 for accessing a remote application with secure device authentication. The method 300 begins with block 302, in which the client computing device 102 transmits a service request to the application server 106. The service request may be embodied as any network request, API call, or other remote request for application services transmitted to the application server 106. For example, the service request may be embodied as a hypertext transport protocol (HTTP) request. The client computing device 102 may transmit the service request in response to a user command such as selecting a hyperlink or entering a web address in a web browser.

In block 304, the client computing device 102 receives a redirect from the application server 106. The redirect identifies the identity provider 104 and may identify a particular API request, web address (e.g., URL or URI), or other command to invoke on the identity provider 104. For example, in some embodiments the redirect may be embodied as an HTTP redirect that identifies the identity provider 104. The redirect may also include additional data that is to be relayed to the identity provider 104. In some embodiments, in block 306 the client computing device 102 may receive a security assertion markup language (SAML) request included in the redirect. The SAML request may be embedded as one or more attribute values in the web address associated with an HTTP redirect. The SAML request may be embodied as a structured text document describing one or more authentication requests and/or security assertions. For example, the SAML request may be generated based on the web browser single-sign-on profile described by the SAML version 2.0 standard approved by OASIS®.

In block 308, the client computing device 102 transmits an authentication request to the identity provider 104. The authentication request may include data included with the redirect received from the application server 106. For example, in some embodiments, the client computing device 102 may load the web address supplied with an HTTP redirect received from the application server 106. The client computing device 102 may transmit the authentication request to the identity provider 104 using a public network connection, that is, without first establishing a virtual private network connection or otherwise authenticating with edge infrastructure or other gateway services associated with the identity provider 104. The client computing device 102 may include data received from the application server 106 as, for example, data encoded in one or more attribute values of the web address. In some embodiments, in block 310, the client computing device 102 may transmit the SAML request received from the application server 106 to the identity provider 104.

In block 312, the client computing device 102 receives an authentication challenge from the identity provider 104. The authentication challenge may be embodied as any request, application, structured document, or other message requesting the client computing device 102 to authenticate the current user. The client computing device 102 may receive the authentication challenge using a public network connection. In some embodiments, in block 314 the client computing device 102 may receive the authentication challenge as an interactive form from the identity provider 104. For example, the client computing device 102 may receive an HTML form element, an XML form, a PDF form, or any other interactive interface that allows a user to input the user's credentials.

In block 316, the client computing device 102 generates an authentication challenge response to authenticate the user. The authentication challenge response may include user credentials or any other data that may be used by the identity provider 104 to verify the identity or otherwise authenticate the current user of the client computing device 102. For example, the client computing device 102 may collect a username and password from the user in an interactive form, and the authentication challenge response may include the username and password as form field values. Additionally or alternatively, the authentication challenge response may include data based on other authentication factors (e.g., biometric authentication factors, security tokens or smart cards, etc.).

In block 318, the capability proxy 208 of the client computing device 102 intercepts the authentication challenge response. The capability proxy 208 may use any technique to intercept the authentication challenge response prior to the authentication challenge response being transmitted to the identity provider 104. For example, the client computing device 102 may redirect network requests or other traffic associated with the authentication challenge response to the capability proxy 208. In some embodiments, in block 320 the capability proxy 208 may intercept a submit action associated with the interactive authentication form. For example, an interactive authentication form such as an HTML form may identify a web address (i.e. a URL or URI) associated with a submit input of the HTML form. The client computing device 102 may intercept requests to that web address and redirect those requests to the capability proxy 208. As another example, the client computing device 102 may intercept user selections of the submit input and redirect those selections to the capability proxy 208.

In block 322, the capability proxy 208 of the client computing device 102 retrieves one or more security assertions from the secure environment 210. Each security assertion may be embodied as any identifier, certificate, or other data that is indicative of a level of trust that has been assigned to the client computing device 102 by an enterprise or device owner. The capability proxy 208 may retrieve the security assertions in response to one or more HTTP requests received by the capability proxy 208. For example, in some embodiments, the capability proxy 208 may be embodied as an embedded web server. In those embodiments, the capability proxy 208 may establish an HTTP-based interface such as a RESTful API that allows other components of the client computing device 102 (and in some embodiments, remote devices) to query and otherwise access platform capabilities of the client computing device 102. The capability proxy 208 thus provides an HTTP-based interface to platform capabilities that may not be exposed or otherwise accessible through ordinary operating system software of the client computing device 102. The capability proxy 208 may be embodied as any combination of software, firmware, or hardware of the client computing device 102. For example, the capability proxy 208 may be embodied as Intel® Technology Access (TA). By providing an HTTP-based interface, the capability proxy 208 allows access to platform hardware and/or firmware capabilities to web applications without requiring plug-ins, native code, or other specialized components.

As described above, the client computing device 102 retrieves the security assertions from the secure environment 210. The client computing device 102 may retrieve the security assertions using any appropriate technique. In some embodiments, in block 324 the client computing device 102 may retrieve the security assertions from the manageability engine 130. In some embodiments, in block 326, the client computing device 102 may retrieve the security assertions from tamper-resistant software of the client computing device 102.

In block 328, shown in FIG. 3B, the capability proxy 208 of the client computing device 102 generates a resource access token (RAT) based on the security assertions. The RAT may be embodied as any data item that securely represents the contents of the associated security assertions. In some embodiments, the RAT may be generated using a device-specific encryption key associated with the client computing device 102. For example, the RAT may be encrypted or cryptographically signed with the device-specific encryption key. In some embodiments, in block 330 the client computing device 102 may generate the RAT based on one or more provisioned device management policies. In those embodiments, a security assertion may indicate that a device management policy has been provisioned to the client computing device 102 by an enterprise or device owner. In other words, the security assertion may indicate that the client computing device 102 is currently subject to a device management policy. Thus, the RAT may indicate that the client computing device 102 is subject to the device management policy, and in some embodiments may also indicate that the device management policy is valid (e.g., by identifying a valid certificate, identifying the device owner, etc.). In some embodiments, in block 332 the client computing device 102 may generate the RAT based on one or more device trust level assertions provisioned by the enterprise or device owner. A device trust level assertion may be embodied as any identifier or other data provisioned by the enterprise or device owner that associates the client computing device 102 with a particular level of trustworthiness.

In block 334, the capability proxy 208 of the client computing device 102 transmits the authentication challenge response including the RAT to the identity provider 104. The capability proxy 208 may use any technique to transmit the RAT. In some embodiments, the capability proxy 208 may wrap or otherwise embed the RAT in the authentication challenge response. For example, the capability proxy 208 may encode the RAT as an HTML form field value within the authentication challenge response. Additionally, although illustrated as being transmitted by the capability proxy 208, in some embodiments the capability proxy 208 may embed the RAT in the authentication challenge response and the authentication challenge response may be transmitted by another component of the client computing device 102 such as a web browser. The client computing device 102 may transmit the authentication challenge response including the RAT to the identity provider 104 using a public network connection.

In block 336, the client computing device 102 receives an authentication response from the identity provider 104. The authentication response indicates whether the user and the client computing device 102 were successfully authenticated by the identity provider 104. Authentication of the user and the client computing device 102 are described further below in connection with FIG. 4. The authentication response may be embodied as data in any format that is indicative of whether authentication was successful. The client computing device 102 may receive the authentication response from the identity provider 104 using a public network connection. In some embodiments, in block 338, the client computing device 102 may receive the authentication response as a SAML response, which may include one or more assertions indicating whether authentication was successful.

In block 340, the client computing device 102 transmits the authentication response to the application server 106. As described further below in connection with FIG. 5, the application server 106 may analyze the authentication response to determine whether to allow access to the requested application and/or service. In some embodiments, in block 342 the client computing device 102 may transmit the SAML response received from the identity provider 104 to the application server 106.

In block 344, the client computing device 102 accesses the application and/or service of the application server 106 based on the access granted by the authentication response. The client computing device 102 may use any appropriate technique to access the application server 106. For example, the client computing device 102 may access the application and/or service using a web browser or other client interface. Of course, when the user or the client computing device 102 failed to be authenticated by the identity provider 104, access to the application and/or service may be denied by the application server 106. After accessing the application, the method 300 loops back to block 302 shown in FIG. 3A to continue generating service requests to the application server 106.

Figure 4:
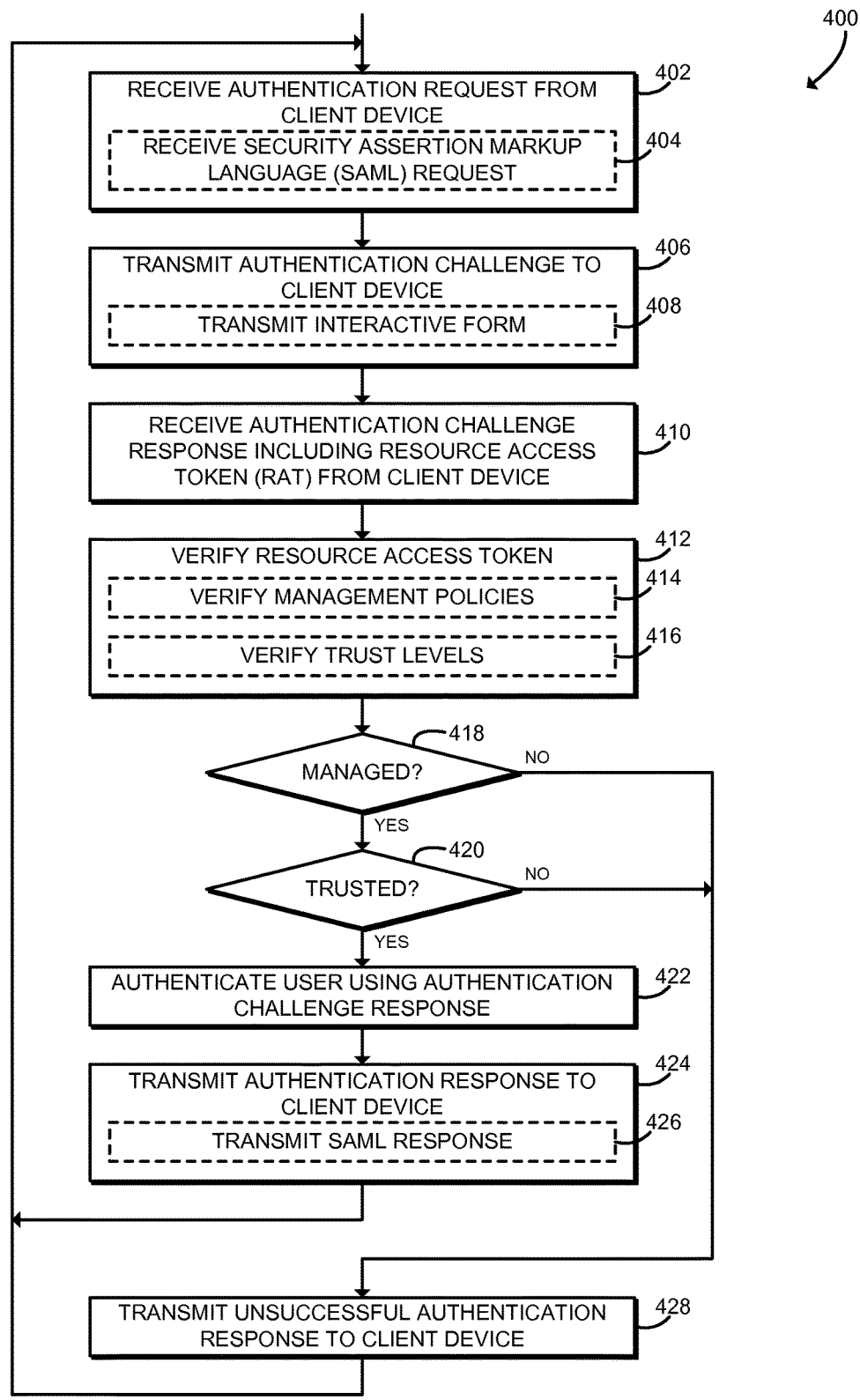
FIG. 4 is a simplified flow diagram of at least one embodiment of a method for secure device authentication that may be executed by an identity provider of the system of FIGS. 1 and 2.

Referring now to FIG. 4, in use, the identity provider 104 may execute a method 400 for secure user authentication and device authentication. The method 400 begins with block 402, in which the identity provider 104 receives an authentication request from a client computing device 102. As described above, the authentication request may include data received by the client computing device 102 from the application server 106. For example, in some embodiments, the client computing device 102 may load a web address supplied with an HTTP redirect received from the application server 106. As described above, the identity provider 104 may receive the authentication request from the client computing device 102 using a public network connection, that is, without the client computing device 102 first establishing a virtual private network connection or otherwise authenticating with edge infrastructure or other gateway services associated with the identity provider 104. The client computing device 102 may include data received from the application server 106 as, for example, data encoded in one or more attribute values of the web address. In some embodiments, in block 404, the identity provider 104 may receive a security assertion markup language (SAML) request that was originally transmitted from the application server 106 to the client computing device 102.

In block 406, the identity provider 104 transmits an authentication challenge to the client computing device 102. As described above, the authentication challenge may be embodied as any request, application, structured document, or other message requesting the client computing device 102 to authenticate the current user. The identity provider 104 may transmit the authentication challenge to the client computing device 102 using a public network connection. In some embodiments, in block 408 the identity provider 104 may transmit the authentication challenge as an interactive form to the client computing device 102. For example, the identity provider 104 may transmit an HTML form element, an XML form, a PDF form, or any other interactive interface that allows a user to input the user's credentials.

In block 410, the identity provider 104 receives an authentication challenge response including a resource access token (RAT) from the client computing device 102. As described above, the authentication challenge response may include user credentials or any other data that may be used by the identity provider 104 to verify the identity or otherwise authenticate the current user of the client computing device 102. For example, the authentication challenge response may include a username and password as form field values. Additionally or alternatively, the authentication challenge response may include data based on other authentication factors (e.g., biometric authentication factors, security tokens or smart cards, etc.). As described above, the RAT may be embodied as any data item that securely represents the contents of one or more security assertions associated with the client computing device 102. For example, the RAT may indicate that the client computing device 102 is subject to a device management policy, or the RAT may indicate one or more device trust level assertions provisioned by an enterprise or device owner. In some embodiments, the RAT may be generated using a device-specific encryption key associated with the client computing device 102. For example, the RAT may be encrypted or cryptographically signed with the device-specific encryption key. The identity provider 104 may receive the authentication challenge response from the client computing device 102 using a public network connection.

In block 412, the identity provider 104 verifies the resource access token (RAT) provided by the client computing device 102. The identity provider 104 analyzes the security assertions represented by the RAT and determines, based on those security assertions, whether the client computing device 102 is considered sufficiently trustworthy by the enterprise or device owner. In some embodiments, in block 414, the identity provider 104 may verify one or more device management policies associated with the client computing device 102. The identity provider 104 may, for example, determine whether the client computing device 102 is subject to a device management policy and/or whether the device management policy is valid (e.g., by identifying a valid certificate, identifying the device owner, etc.). In some embodiments, in block 416, the identity provider 104 may verify one or more device trust level assertions associated with the client computing device 102. The identity provider 104 may verify, for example, that the device trust level assertion associated with the client computing device 102 meets or exceeds a threshold trust level established by the enterprise or device owner.

In block 418, the identity provider 104 determines whether the client computing device 102 is subject to management by the enterprise or device owner, for example by determining whether it is subject to a valid device management policy. If not, the method 400 branches ahead to block 428, described below. If the client computing device 102 is subject to management, the method 400 advances to block 420, in which the identity provider 104 determines whether the client computing device 102 is trusted by the enterprise or device owner. The identity provider 104 may, for example, compare a device trust level assertion of the client computing device 102 to a threshold device trust level. In some embodiments, the client computing device 102 may be trusted if subject to a device management policy, and thus the processes of blocks 418, 420 may be combined. If the client computing device 102 is not trusted, the method 400 branches ahead to block 428, as described below. If the client computing device 102 is trusted, the method 400 advances to block 422.

In block 422, the identity provider 104 authenticates the user of the client computing device 102 based on the authentication challenge response received from the client computing device 102. The identity provider 104 may use any technique for authenticating the user. For example, the identity provider 104 may verify user credentials using an enterprise directory server or other enterprise authentication system.

In block 424, the identity provider 104 transmits an authentication response to the client computing device 102. As described above, the authentication response indicates whether the user and the client computing device 102 were successfully authenticated by the identity provider 104. The authentication response may be embodied as data in any format that is indicative of whether authentication was successful. The identity provider 104 may transmit the authentication response to the client computing device 102 using a public network connection. In some embodiments, in block 426, the identity provider 104 may transmit the authentication response as a SAML response, which may include one or more assertions indicating whether authentication was successful. After transmitting the authentication response, the method 400 loops back to block 402 to process additional authentication requests.

Referring back to blocks 418, 420, if the client computing device 102 is not managed or if the client computing device 102 is not trusted, the method 400 branches ahead to block 428. In block 428, the identity provider 104 transmits an unsuccessful authentication response to the client computing device 102. The unsuccessful authentication response may be embodied in any appropriate data format. As described above, if the authentication response is unsuccessful, the application server 106 will deny access to the client computing device 102. After transmitting the unsuccessful authentication response, the method 400 loops back to block 402 to process additional authentication requests.

Figure 5:
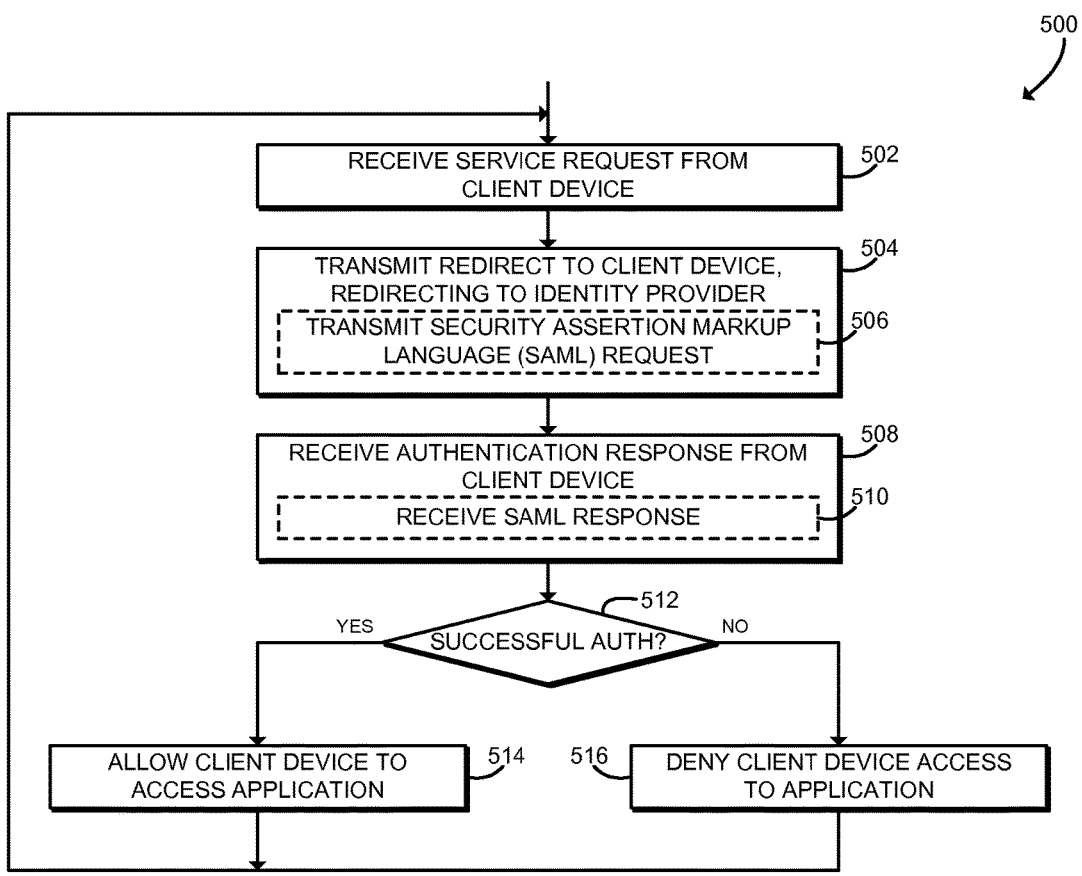
FIG. 5 is a simplified flow diagram of at least one embodiment of a method for secure device authentication that may be executed by an application server of the system of FIGS. 1 and 2.

Referring now to FIG. 5, in use, the application server 106 may execute a method 500 for securely providing access to an application hosted by the application server 106. The method 500 begins in block 502, in which the application server 106 receives a service request from a client computing device 102. As described above, the service request may be embodied as any network request, API call, or other remote request for application services received by the application server 106. For example, the service request may be embodied as a hypertext transport protocol (HTTP) request.

In block 504, after receiving the service request, the application server 106 transmits a redirect to the client computing device 102 that identifies the identity provider 104. As described above, the redirect may identify a particular API request, web address (e.g., URL or URI), or other command to invoke on the identity provider 104. For example, in some embodiments the redirect may be embodied as an HTTP redirect that identifies the identity provider 104. The redirect may also include additional data that is to be relayed to the identity provider 104. In some embodiments, in block 506 the application server 106 may transmit a security assertion markup language (SAML) request included in the redirect. The SAML request may be embedded as one or more attribute values in the web address associated with an HTTP redirect. The SAML request may be embodied as a structured text document describing one or more authentication requests and/or security assertions. For example, the SAML request may be generated based on the web browser single-sign-on profile described by the SAML version 2.0 standard approved by OASIS®.

In block 508, the application server 106 receives an authentication response from the client computing device 102. As described above, the authentication response indicates whether the user and the client computing device 102 were successfully authenticated by the identity provider 104. The authentication response may have been originally received by the client computing device 102 from the identity provider 104 and then transmitted from the client computing device 102 to the application server 106. In some embodiments, in block 510 the application server 106 may receive the authentication response as a SAML response.

In block 512, the application server 106 determines whether the user and client computing device 102 were successfully authenticated based on the authentication response. If authentication was successful, the method 500 branches to block 514. In block 514, the application server 106 allows the client computing device 102 to access the application and/or service provided by the application server 106. After allowing access, the method 500 loops back to block 502 to process additional service requests.

Referring back to block 512, if the authentication was not successful, the method 500 branches to block 516, in which the application server 106 denies the client computing device 102 access to the application and/or service provided by the application server 106. The application server 106 may transmit a deny message to the client computing device 102, for example indicating an authentication failure or indicating access denied. After denying access, the method 500 loops back to block 502 to process additional service requests.

EXAMPLES

Illustrative examples of the technologies disclosed herein are provided below. An embodiment of the technologies may include any one or more, and any combination of, the examples described below.

Example 1 includes a computing device for remote device authentication, the computing device comprising a user authentication module to receive an authentication challenge from an identity provider; and generate an authentication challenge response to authenticate a user of the computing device in response to receipt of the authentication challenge; and a device capability module to intercept the authentication challenge response in response to generation of the authentication challenge response; retrieve a security assertion from a secure environment of the computing device in response to interception of the authentication challenge response; generate a resource access token as a function of the security assertion; and transmit the authentication challenge response including the resource access token to the identity provider.

Example 2 includes the subject matter of Example 1, and wherein to receive the authentication challenge from the identity provider comprises to receive the authentication challenge via a public network connection with the identity provider; and to transmit the authentication challenge response comprises to transmit the authentication challenge response via the public network connection.

Example 3 includes the subject matter of any of Examples 1 and 2, and wherein the authentication challenge comprises an interactive form.

Example 4 includes the subject matter of any of Examples 1-3, and wherein to intercept the authentication challenge response comprises to intercept a submit action of the interactive form.

Example 5 includes the subject matter of any of Examples 1-4, and wherein to retrieve the security assertion from the secure environment comprises to retrieve the security assertion from a manageability engine of the computing device.

Example 6 includes the subject matter of any of Examples 1-5, and wherein to retrieve the security assertion from the secure environment comprises to retrieve the security assertion from a tamper-resistant software component of the computing device.

Example 7 includes the subject matter of any of Examples 1-6, and wherein the security assertion comprises an indication that the computing device is subject to a device management policy.

Example 8 includes the subject matter of any of Examples 1-7, and wherein the security assertion comprises a device trust level assertion associated with the computing device.

Example 9 includes the subject matter of any of Examples 1-8, and wherein to generate the resource access token comprises to encrypt the resource access token using a key associated with the computing device.

Example 10 includes the subject matter of any of Examples 1-9, and wherein the device capability module comprises an embedded technology access server of the computing device; and to retrieve the security assertion comprises to (i) issue an HTTP request to the embedded technology access server and (ii) retrieve, by the embedded technology access server, the security assertion in response to issuance of the HTTP request.

Example 11 includes the subject matter of any of Examples 1-10, and further including a manageability engine to execute the embedded technology access server.

Example 12 includes the subject matter of any of Examples 1-11, and further including a single-sign-on module to transmit a service request to an application server; receive a redirect from the application server in response to transmission of the service request, wherein the redirect identifies the identity provider; transmit an authentication request to the identity provider in response to receipt of the redirect; receive an authentication response from the identity provider in response to transmission of the authentication challenge response; transmit the authentication response to the application server in response to receipt of the authentication response from the identity provider; and access an application of the application server in response to transmission of the authentication response to the application server; wherein to receive the authentication challenge from the identity provider comprises to receive the authentication challenge in response to transmission of the authentication request.

Example 13 includes the subject matter of any of Examples 1-12, and wherein the authentication request comprises a security assertion markup language request and the authentication response comprises a security assertion markup language response.

Example 14 includes a computing device for remote device authentication, the computing device comprising a user authentication module to receive an authentication request from a client computing device; transmit an authentication challenge to the client computing device in response to receipt of the authentication request; and receive an authentication challenge response from the client computing device in response to transmission of the authentication challenge, wherein the authentication challenge response includes a resource access token indicative of a security assertion of the client computing device; and a device verification module to determine whether the client computing device is trusted based on the resource access token of the authentication challenge response; wherein the user authentication module is further to transmit a successful authentication response to the client computing device in response to a determination that the client computing device is trusted.

Example 15 includes the subject matter of Example 14, and wherein to receive the authentication request from the client computing device comprises to receive the authentication request via a public network connection with the client computing device; to transmit the authentication challenge to the client computing device comprises to transmit the authentication challenge to the client computing device via the public network connection; to receive the authentication challenge response from the client computing device comprises to receive the authentication challenge response from the client computing device via the public network connection; and to transmit the successful authentication response to the client computing device comprises to transmit the successful authentication response to the client computing device via the public network connection.

Example 16 includes the subject matter of any of Examples 14 and 15, and wherein the authentication request comprises a security assertion markup language request and the authentication response comprises a security assertion markup language response.

Example 17 includes the subject matter of any of Examples 14-16, and wherein the authentication challenge comprises an interactive form.

Example 18 includes the subject matter of any of Examples 14-17, and wherein to determine whether the client computing device is trusted comprises to determine whether the client computing device is subject to a device management policy based on the resource access token.

Example 19 includes the subject matter of any of Examples 14-18, and wherein to determine whether the client computing device is trusted comprises to determine a device trust level assertion associated with the client computing device based on the resource access token.

Example 20 includes the subject matter of any of Examples 14-19, and wherein to determine whether the client computing device is trusted based on the resource access token of the authentication challenge response comprises to process the resource access token using an encryption key associated with the client computing device.

Example 21 includes the subject matter of any of Examples 14-20, and wherein the user authentication module is further to authenticate a user of the client computing device using the authentication challenge response; and to transmit the successful authentication response further comprises to transmit the successful authentication response in response to authentication of the user.

Example 22 includes a method for remote device authentication, the method comprising receiving, by a computing device, an authentication challenge from an identity provider; generating, by the computing device, an authentication challenge response to authenticate a user of the computing device in response to receiving the authentication challenge; intercepting, by a device capability module of the computing device, the authentication challenge response in response to generating the authentication challenge response; retrieving, by the device capability module, a security assertion from a secure environment of the computing device in response to intercepting the authentication challenge response; generating, by the device capability module, a resource access token as a function of the security assertion; and transmitting, by the device capability module, the authentication challenge response including the resource access token to the identity provider.

Example 23 includes the subject matter of Example 22, and wherein receiving the authentication challenge from the identity provider comprises receiving the authentication challenge via a public network connection with the identity provider; and transmitting the authentication challenge response comprises transmitting the authentication challenge response via the public network connection.

Example 24 includes the subject matter of any of Examples 22 and 23, and wherein receiving the authentication challenge comprises receiving an interactive form from the identity provider.

Example 25 includes the subject matter of any of Examples 22-24, and wherein intercepting the authentication challenge response comprises intercepting a submit action of the interactive form.

Example 26 includes the subject matter of any of Examples 22-25, and wherein retrieving the security assertion from the secure environment comprises retrieving the security assertion from a manageability engine of the computing device.

Example 27 includes the subject matter of any of Examples 22-26, and wherein retrieving the security assertion from the secure environment comprises retrieving the security assertion from a tamper-resistant software component of the computing device.

Example 28 includes the subject matter of any of Examples 22-27, and wherein retrieving the security assertion comprises retrieving an indication that the computing device is subject to a device management policy.

Example 29 includes the subject matter of any of Examples 22-28, and wherein retrieving the security assertion comprises retrieving a device trust level assertion associated with the computing device.

Example 30 includes the subject matter of any of Examples 22-29, and wherein generating the resource access token comprises encrypting the resource access token using a key associated with the computing device.

Example 31 includes the subject matter of any of Examples 22-30, and wherein retrieving the security assertion comprises issuing an HTTP request to an embedded technology access server of the computing device; and retrieving, by the embedded technology access server, the security assertion in response to issuing the HTTP request.

Example 32 includes the subject matter of any of Examples 22-31, and further including executing, by a manageability engine of the computing device, the embedded technology access server.

Example 33 includes the subject matter of any of Examples 22-32, and further including transmitting, by the computing device, a service request to an application server; receiving, by the computing device, a redirect from the application server in response to transmitting the service request, wherein the redirect identifies the identity provider; transmitting, by the computing device, an authentication request to the identity provider in response to receiving the redirect; receiving, by the computing device, an authentication response from the identity provider in response to transmitting the authentication challenge response; transmitting, by the computing device, the authentication response to the application server in response to receiving the authentication response from the identity provider; and accessing, by the computing device, an application of the application server in response to transmitting the authentication response to the application server; wherein receiving the authentication challenge from the identity provider comprises receiving the authentication challenge in response to transmitting the authentication request.

Example 34 includes the subject matter of any of Examples 22-33, and wherein the authentication request comprises a security assertion markup language request and the authentication response comprises a security assertion markup language response.

Example 35 includes a method for remote device authentication, the method comprising receiving, by a computing device, an authentication request from a client computing device; transmitting, by the computing device, an authentication challenge to the client computing device in response to receiving the authentication request; receiving, by the computing device, an authentication challenge response from the client computing device in response to transmitting the authentication challenge, wherein the authentication challenge response includes a resource access token indicative of a security assertion of the client computing device; determining, by the computing device, whether the client computing device is trusted based on the resource access token of the authentication challenge response; and transmitting, by the computing device, a successful authentication response to the client computing device in response to determining that the client computing device is trusted.

Example 36 includes the subject matter of Example 35, and wherein receiving the authentication request from the client computing device comprises receiving the authentication request via a public network connection with the client computing device; transmitting the authentication challenge to the client computing device comprises transmitting the authentication challenge to the client computing device via the public network connection; receiving the authentication challenge response from the client computing device comprises receiving the authentication challenge response from the client computing device via the public network connection; and transmitting the successful authentication response to the client computing device comprises transmitting the successful authentication response to the client computing device via the public network connection.

Example 37 includes the subject matter of any of Examples 35 and 36, and wherein the authentication request comprises a security assertion markup language request and the authentication response comprises a security assertion markup language response.

Example 38 includes the subject matter of any of Examples 35-37, and wherein transmitting the authentication challenge comprises transmitting an interactive form to the client computing device.

Example 39 includes the subject matter of any of Examples 35-38, and wherein determining whether the client computing device is trusted comprises determining whether the client computing device is subject to a device management policy based on the resource access token.

Example 40 includes the subject matter of any of Examples 35-39, and wherein determining whether the client computing device is trusted comprises determining a device trust level assertion associated with the client computing device based on the resource access token.

Example 41 includes the subject matter of any of Examples 35-40, and wherein determining whether the client computing device is trusted based on the resource access token of the authentication challenge response comprises processing the resource access token using an encryption key associated with the client computing device.

Example 42 includes the subject matter of any of Examples 35-41, and further including authenticating, by the computing device, a user of the client computing device using the authentication challenge response; wherein transmitting the successful authentication response further comprises transmitting the successful authentication response in response to authenticating the user.

Example 43 includes a computing device comprising a processor; and a memory having stored therein a plurality of instructions that when executed by the processor cause the computing device to perform the method of any of Examples 22-42.

Example 44 includes one or more machine readable storage media comprising a plurality of instructions stored thereon that in response to being executed result in a computing device performing the method of any of Examples 22-42.

Example 45 includes a computing device comprising means for performing the method of any of Examples 22-42.

Example 46 includes a computing device for remote device authentication, the computing device comprising means for receiving an authentication challenge from an identity provider; means for generating an authentication challenge response to authenticate a user of the computing device in response to receiving the authentication challenge; means for intercepting, by a device capability module of the computing device, the authentication challenge response in response to generating the authentication challenge response; means for retrieving, by the device capability module, a security assertion from a secure environment of the computing device in response to intercepting the authentication challenge response; means for generating, by the device capability module, a resource access token as a function of the security assertion; and means for transmitting, by the device capability module, the authentication challenge response including the resource access token to the identity provider.

Example 47 includes the subject matter of Example 46, and wherein the means for receiving the authentication challenge from the identity provider comprises means for receiving the authentication challenge via a public network connection with the identity provider; and the means for transmitting the authentication challenge response comprises means for transmitting the authentication challenge response via the public network connection.

Example 48 includes the subject matter of any of Examples 46 and 47, and wherein the means for receiving the authentication challenge comprises means for receiving an interactive form from the identity provider.

Example 49 includes the subject matter of any of Examples 46-48, and wherein the means for intercepting the authentication challenge response comprises means for intercepting a submit action of the interactive form.

Example 50 includes the subject matter of any of Examples 46-49, and wherein the means for retrieving the security assertion from the secure environment comprises means for retrieving the security assertion from a manageability engine of the computing device.

Example 51 includes the subject matter of any of Examples 46-50, and wherein the means for retrieving the security assertion from the secure environment comprises means for retrieving the security assertion from a tamper-resistant software component of the computing device.

Example 52 includes the subject matter of any of Examples 46-51, and wherein the means for retrieving the security assertion comprises means for retrieving an indication that the computing device is subject to a device management policy.

Example 53 includes the subject matter of any of Examples 46-52, and wherein the means for retrieving the security assertion comprises means for retrieving a device trust level assertion associated with the computing device.

Example 54 includes the subject matter of any of Examples 46-53, and wherein the means for generating the resource access token comprises means for encrypting the resource access token using a key associated with the computing device.

Example 55 includes the subject matter of any of Examples 46-54, and wherein the means for retrieving the security assertion comprises means for issuing an HTTP request to an embedded technology access server of the computing device; and means for retrieving, by the embedded technology access server, the security assertion in response to issuing the HTTP request.

Example 56 includes the subject matter of any of Examples 46-55, and further including means for executing, by a manageability engine of the computing device, the embedded technology access server.

Example 57 includes the subject matter of any of Examples 46-56, and further including means for transmitting a service request to an application server; means for receiving a redirect from the application server in response to transmitting the service request, wherein the redirect identifies the identity provider; means for transmitting an authentication request to the identity provider in response to receiving the redirect; means for receiving an authentication response from the identity provider in response to transmitting the authentication challenge response; means for transmitting the authentication response to the application server in response to receiving the authentication response from the identity provider; and means for accessing an application of the application server in response to transmitting the authentication response to the application server; wherein the means for receiving the authentication challenge from the identity provider comprises means for receiving the authentication challenge in response to transmitting the authentication request.

Example 58 includes the subject matter of any of Examples 46-57, and wherein the authentication request comprises a security assertion markup language request and the authentication response comprises a security assertion markup language response.

Example 59 includes a computing device for remote device authentication, the computing device comprising means for receiving an authentication request from a client computing device; means for transmitting an authentication challenge to the client computing device in response to receiving the authentication request; means for receiving an authentication challenge response from the client computing device in response to transmitting the authentication challenge, wherein the authentication challenge response includes a resource access token indicative of a security assertion of the client computing device; means for determining whether the client computing device is trusted based on the resource access token of the authentication challenge response; and means for transmitting a successful authentication response to the client computing device in response to determining that the client computing device is trusted.

Example 60 includes the subject matter of Example 59, and wherein the means for receiving the authentication request from the client computing device comprises means for receiving the authentication request via a public network connection with the client computing device; the means for transmitting the authentication challenge to the client computing device comprises means for transmitting the authentication challenge to the client computing device via the public network connection; the means for receiving the authentication challenge response from the client computing device comprises means for receiving the authentication challenge response from the client computing device via the public network connection; and the means for transmitting the successful authentication response to the client computing device comprises means for transmitting the successful authentication response to the client computing device via the public network connection.

Example 61 includes the subject matter of any of Examples 59 and 60, and wherein the authentication request comprises a security assertion markup language request and the authentication response comprises a security assertion markup language response.

Example 62 includes the subject matter of any of Examples 59-61, and wherein the means for transmitting the authentication challenge comprises means for transmitting an interactive form to the client computing device.

Example 63 includes the subject matter of any of Examples 59-62, and wherein the means for determining whether the client computing device is trusted comprises means for determining whether the client computing device is subject to a device management policy based on the resource access token.

Example 64 includes the subject matter of any of Examples 59-63, and, wherein the means for determining whether the client computing device is trusted comprises means for determining a device trust level assertion associated with the client computing device based on the resource access token.

Example 65 includes the subject matter of any of Examples 59-64, and wherein the means for determining whether the client computing device is trusted based on the resource access token of the authentication challenge response comprises means for processing the resource access token using an encryption key associated with the client computing device.

Example 66 includes the subject matter of any of Examples 59-65, and further including means for authenticating a user of the client computing device using the authentication challenge response; wherein the means for transmitting the successful authentication response further comprises means for transmitting the successful authentication response in response to authenticating the user.

The invention claimed is:

1. A computing device for remote device authentication, the computing device comprising:
   a user authentication module to:
      receive an authentication challenge from an identity provider; and
      generate an authentication challenge response to authenticate a user of the computing device in response to receipt of the authentication challenge; and
   a device capability module to:
      intercept the authentication challenge response in response to generation of the authentication challenge response;
      retrieve a security assertion from a secure environment of the computing device in response to interception of the authentication challenge response;
      generate a resource access token as a function of the security assertion; and
      transmit the authentication challenge response including the resource access token to the identity provider;
   wherein the device capability module comprises an embedded technology access server of the computing device;
   wherein to retrieve the security assertion comprises to (i) issue an HTTP request to the embedded technology access server and (ii) retrieve, by the embedded technology access server, the security assertion in response to issuance of the HTTP request; and
   wherein the computing device further comprises a manageability engine to execute the embedded technology access server.

2. The computing device of claim 1, wherein:
   to receive the authentication challenge from the identity provider comprises to receive the authentication challenge via a public network connection with the identity provider; and
   to transmit the authentication challenge response comprises to transmit the authentication challenge response via the public network connection.

3. The computing device of claim 1, wherein:
   the authentication challenge comprises an interactive form; and
   to intercept the authentication challenge response comprises to intercept a submit action of the interactive form.

4. The computing device of claim 1, wherein to retrieve the security assertion from the secure environment comprises to retrieve the security assertion from a manageability engine of the computing device.

5. The computing device of claim 1, wherein the security assertion comprises an indication that the computing device is subject to a device management policy.

6. The computing device of claim 1, wherein the security assertion comprises a device trust level assertion associated with the computing device.

7. One or more computer-readable storage media comprising a plurality of instructions that in response to being executed cause a computing device to:
   receive an authentication challenge from an identity provider;
   generate an authentication challenge response to authenticate a user of the computing device in response to receiving the authentication challenge;

intercept, by a device capability module of the computing device, the authentication challenge response in response to generating the authentication challenge response;

retrieve, by the device capability module, a security assertion from a secure environment of the computing device in response to intercepting the authentication challenge response, wherein to retrieve the security assertion comprises to (i) issue an HTTP request to an embedded technology access server of the computing device and (ii) retrieve, by the embedded technology access server, the security assertion in response to issuing the HTTP request;

generate, by the device capability module, a resource access token as a function of the security assertion;

transmit, by the device capability module, the authentication challenge response including the resource access token to the identity provider; and execute, by a manageability engine of the computing device, the embedded technology access server.

8. The one or more computer-readable storage media of claim 7, wherein:
to receive the authentication challenge from the identity provider comprises to receive the authentication challenge via a public network connection with the identity provider; and
to transmit the authentication challenge response comprises to transmit the authentication challenge response via the public network connection.

9. The one or more computer-readable storage media of claim 7, wherein:
to receive the authentication challenge comprises to receive an interactive form from the identity provider; and
to intercept the authentication challenge response comprises to intercept a submit action of the interactive form.

10. The one or more computer-readable storage media of claim 7, wherein to retrieve the security assertion comprises to retrieve an indication that the computing device is subject to a device management policy.

11. The one or more computer-readable storage media of claim 7, wherein to retrieve the security assertion comprises to retrieve a device trust level assertion associated with the computing device.

12. A method for remote device authentication, the method comprising:

receiving, by a computing device, an authentication challenge from an identity provider;

generating, by the computing device, an authentication challenge response to authenticate a user of the computing device in response to receiving the authentication challenge;

intercepting, by a device capability module of the computing device, the authentication challenge response in response to generating the authentication challenge response;

retrieving, by the device capability module, a security assertion from a secure environment of the computing device in response to intercepting the authentication challenge response, wherein retrieving the security assertion comprises (i) issuing an HTTP request to an embedded technology access server of the computing device and (ii) retrieving, by the embedded technology access server, the security assertion in response to issuing the HTTP request;

generating, by the device capability module, a resource access token as a function of the security assertion;

transmitting, by the device capability module, the authentication challenge response including the resource access token to the identity provider; and executing, by a manageability engine of the computing device, the embedded technology access server.

13. The method of claim 12, wherein:
receiving the authentication challenge from the identity provider comprises receiving the authentication challenge via a public network connection with the identity provider; and
transmitting the authentication challenge response comprises transmitting the authentication challenge response via the public network connection.

14. The method of claim 12, wherein:
receiving the authentication challenge comprises receiving an interactive form from the identity provider; and
intercepting the authentication challenge response comprises intercepting a submit action of the interactive form.

15. The method of claim 12, wherein retrieving the security assertion comprises retrieving an indication that the computing device is subject to a device management policy.

16. The method of claim 12, wherein retrieving the security assertion comprises retrieving a device trust level assertion associated with the computing device.

* * * * *